INVENTOR
GAVIN D. JENNEY
BY Nilsson + Robbins
ATTORNEYS

United States Patent Office 3,496,836
Patented Feb. 24, 1970

3,496,836
REDUNDANT CONTROL SYSTEM HAVING FAIL-OPERATE FAIL-NEUTRAL AND CHANNEL EMERGENCY SELECT
Gavin D. Jenney, Dayton, Ohio, assignor to Bell Aerospace Corporation, a corporation of Delaware
Filed Jan. 2, 1968, Ser. No. 695,103
Int. Cl. F15b *13/04, 20/00;* B64c *17/00*
U.S. Cl. 91—411
12 Claims

ABSTRACT OF THE DISCLOSURE

Disclosed is a redundant control system having four channels, three of which are capable of providing working fluid to position a movable member in response to input signals applied to the system. Monitor signals developed by each of the four channels are compared to ascertain discrepancies therebetween. Any discrepancy indicates a malfunction wihch is detected by comparing selected pairs of the monitor signals. Such a discrepancy actuates switch means to disable a predetermined channel in which the malfunction occurred. Two such malfunctions may occur without degradation of system performance. Upon the occurrence of a third malfunction, the controlled member is positioned to a predetermined position automatically. If desired, the operator of the system may select any one of the channels capable of positioning the movable member even though it may have been automatically disabled previously.

BACKGROUND OF THE INVENTION

The present invention is adaptable for use in many applications where the position of a movable member is to be controlled. One such application is to position multiple control surfaces on aircraft or similar vehicles in response to input signals applied thereto and therefore, the present invention will be described with respect to such an application.

The complexity weight and flight patterns of the present generation of aircraft necessitate the utilization of power assist to effect proper control thereof. Such power assist is further necessitated in many instances because of the inherent instability of high speed supersonic type aircraft or alternatively because of the weight and large control surfaces embodied in heavy subsonic type aircraft. In those instances where power assist is necessary, a corollary thereof is the necessity to detect failures which may occur throughout the control system and to quickly eliminate the failed portions of the system from control. If such failures are not detected and properly eliminated, particularly in high speed aircraft, damage to the aircraft may result. Detection and reaction time of the human being in such aircraft is not sufficiently fast. A detection and reaction time, including switching the failure out of the control system, on the order of 50 milliseconds or less is required, in aircraft of the type above referred to.

Furthermore, where the cargo or the mission of the aircraft is sufficiently important, it is often required that the aircraft control system be capable of suffering at least two consecutive similar (or dissimilar) failures while maintaining complete operability so the mission of the aircraft may be completed. The term hydraeric as used throughout the specification and claims is generic to fluid under pressure and includes both hydraulics and pneumatics.

BRIEF DESCRIPTION OF THE DRAWINGS

A thorough understanding of the present invention, both as to its organization and method of operation will become apparent from a consideration of the following description taken in conjunction with the accompanying drawings which are presented by way of example only and are not intended as a limitation upon the scope of the claims appended hereto and in which:

BRIEF SUMMARY OF THE INVENTION

The hydraeric redundant control system in accordance with the present invention includes at least four channels, three of which are capable of providing hydraeric fluid to an actuator which is connected to position a movable member in response to input signals applied to the system. Four sensor means are connected individually to each of the four channels to provide a monitor signal which indicates the status of the particular channel at all times. A comparator apparatus is connected to receive the monitor signals and compare individual pairs thereof so as to detect any discrepancy therebetween. In the event of a detected discrepancy, switch means which is connected to the comparator means operates to disable the preselected channel which caused the discrepancy to occur. In the event of the detection of three consecutive discrepancies additional apparatus is provided which positions the controlled or movable member in a predetermined position.

DESCRIPTION OF THE ILLUSTRATIVE EMBODIMENT

Figure 1:
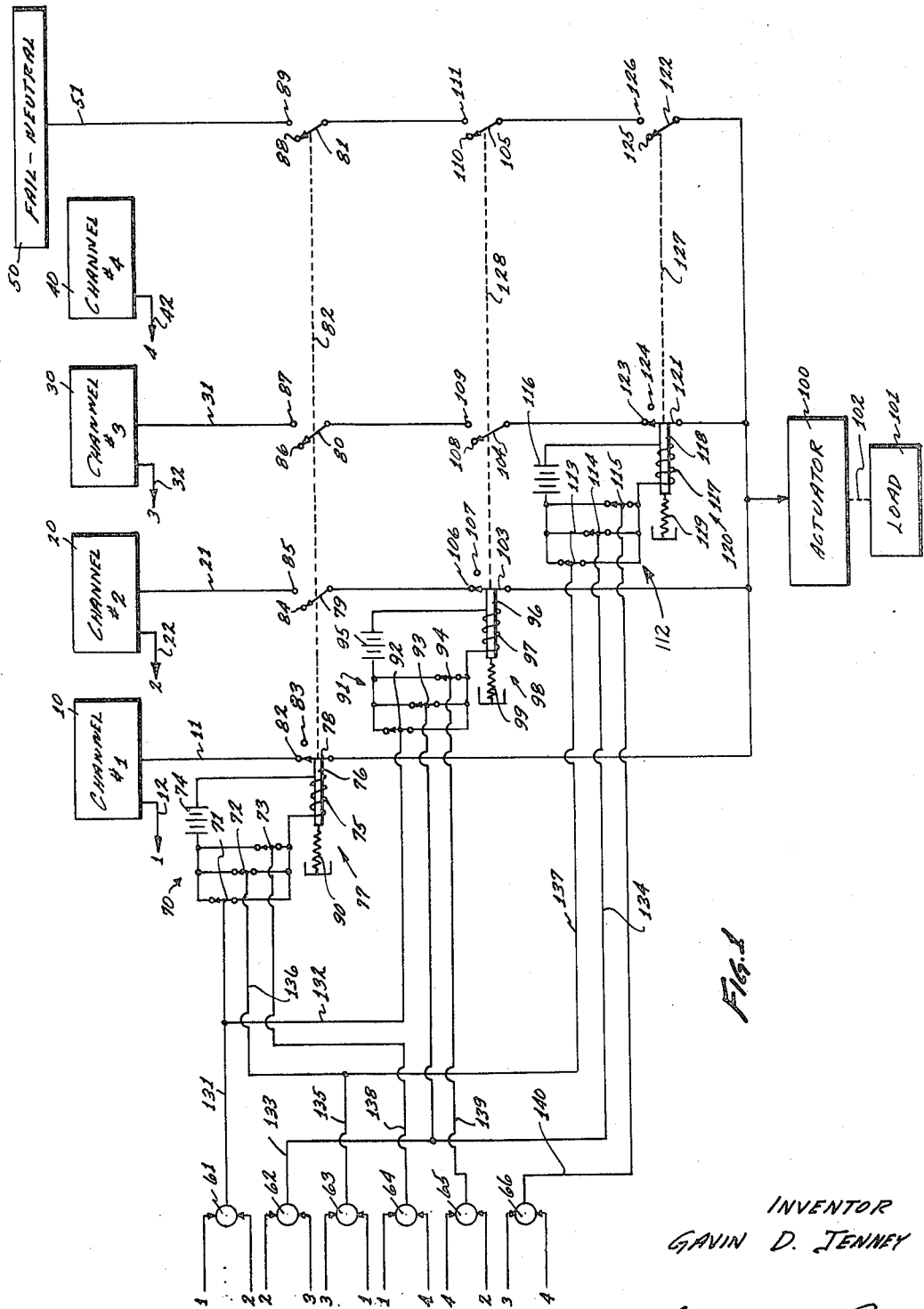
FIGURE 1 is a schematic illustration of one form of the present invention as it may be constructed utilizing electro-mechanical components.

Referring now to the drawings and more particularly to FIGURE 1 thereof, there is illustrated in schematic form an electro-mechanical embodiment of the present invention. As is therein shown, there are provided four distinct channels, 1 through 4 indicated by the blocks 10, 20, 30 and 40. Channels 10, 20 and 30 are adapted to supply working fluid over lines 11, 21 and 31 respectively to an actuator 100 which is connected to a load 101 as illustrated by the dashed line 102. A fail-neutral means 50 is also connected by means of the line 51 to provide working fluid to the actuator 100. Each of the channels 10, 20, 30 and 40 includes sensor apparatus which generate monitor signals 1, 2, 3 and 4 which are indicative of the status of the respective channel. Monitor signals 1, 2, 3 and 4 are applied by lines 12, 22, 32 and 42 respectively to the comparators 61 through 66. The apparatus which is embodied in each of the channels 10, 20, 30 and 40 both for application of the working fluid and for generation of the monitor signal may, for example, be similar to that illustrated in U.S. Patent 3,338,138, and therefore no detailed illustration or description thereof will be provided herein.

As is illustrated, monitor signal 1 is applied to comparators 61, 63 and 64, monitor signal 2 is applied to comparators 61, 62 and 65, monitor signal 3 is applied to comparators 62, 63 and 66, and monitor signal 4 is applied to comparators 64, 65 and 66. The comparators 61 through 66 may take any form desired so long as they are capable of comparing the two individual monitor signals applied thereto and detecting any discrepancy which may occur therebetween. If, for example, the monitor signals are hydraeric pressure signals, the comparator apparatus may be of the type illustrated in the Patent 3,338,-138. It should, however, be expressly understood that the comparators may not be hydraeric in operation but may be electrical or electro-mechanical. The only requirement being that the comparators must be capable of detecting discrepancy between the two monitor signals applied thereto and in the event of such a discrepancy generating a signal at the output thereof.

Output signals generated by the comparators in response to discrepancy of the signals applied thereto are in turn applied to switch means, illustrated schematically in FIGURE 1, which controls the application of the working fluid over the lines 11, 21 and 31. A first such switch means is illustrated generally at 70 and includes three switches 71, 72 and 73 which are connected in parallel between a source of potential such as the battery 74 and the energizing coil 75 of a plunger 76 of a switch 77. The switch 77 includes movable contact arms 78, 79, 80 and 81 which are ganged together as shown by the dash line 82. Movable contact arm 78 operates between stationary contacts 82 and 83. The movable contact arm 79 operates between stationary contacts 84 and 85. The movable contact arm 80 operates between stationary contacts 86 and 87 while the movable contact arm 81 operates between stationary contacts 88 and 89. Spring means 90 continuously urges the plunger 76 toward the right as viewed in FIGURE 1. The switch 77 is shown in the position wherein the coil 75 is energized by the battery 74 and all of the contacts 78 through 81 have been pulled toward the left as viewed in FIGURE 1.

A similar switching arrangement is shown by the switch means 91 connected in the line 21 of channel 2. The switching means 91 includes switches 92, 93 and 94 connected in parallel between the battery 95 and the coil 97 of the switch means 98. The coil 97, upon being energized, actuates the plunger 96 against the spring means 99, so as to operate the ganged movable contact arms 103, 104 and 105 shown connected together by the dashed line 128. Movable contact arm 103 operates between stationary contacts 106 and 107, arm 104 between stationary contacts 108 and 109, and arm 105 between stationary contacts 110 and 111.

A switch means 112 similar to those above described is connected in the line 31 of channel 3 and includes arms 113, 114 and 115 connected in parallel between the battery 116 and the coil 117 which when energized operates the plunger 118 against the spring 119 of the switch 120. Movement of the plunger 118 moves the movable contact arms 121 and 122 which are ganged together as shown by dashed line 127. Arm 121 operates between stationary contacts 123 and 124 while the arm 122 operates between stationary contacts 125 and 126.

In the event that comparator 61 detects a discrepancy between the monitor signals 1 and 2 applied thereto, a signal is applied over lines 131 and 132 to switches 71 and 92 respectively.

In the event comparator 62 detects a discrepancy between the signals 2 and 3 applied thereto a signal is applied over lines 133 and 134 to switches 93 and 114 respectively. In the event comparator 63 detects a discrepancy between signals 1 and 3 applied thereto, an output signal is applied over line 135 to the interconnection with lines 136 and 137. The signal is thus applied over lines 136 and 137 to switches 72 and 113 respectively. In the event that the comparator 64 detects a discrepancy in the monitor signals 1 and 4 applied thereto a signal is applied over line 138 to switch 73. In the event that comparator 65 detects a discrepancy between monitor signals 2 and 4 applied thereto an output signal is applied over line 139 to switch 94. In the event that comparator 66 detects a discrepancy between monitor signals 3 and 4 applied thereto a signal is applied over line 140 to switch 115.

During normal operation, with the switches 77, 98 and 120 in the position illustrated in FIGURE 1, input signals applied to channels 1, 2, 3 and 4 create output signals therein such that working fluid appears in lines 11, 21 and 31 and monitor signals 1, 2, 3 and 4 of substantially equal phase and amplitude appear on lines 12, 22, 32 and 42 respectively. Under these conditions only the working fluid in line 11 passes through the closed switch 78–82 to the actuator 100 to position the load 101. The lines 21 and 31 are open as illustrated.

Assuming that a failure occurs in channel 1 so that the monitor signal 1 is not in agreement with monitor signals 2, 3 and 4, the following sequence of events occurs. Comparator 61 detects a discrepancy between the monitor signals 1 and 2 and applies a signal over the lines 131 and 132 to cause the switches 71 and 92 to become open. Although no mechanism is illustrated to effect the opening of the switch, any one skilled in the art will readily recognize various forms which such mechanisms may take. Likewise, comparator 63 and 64 applies output singals as a result of detected discrepancies, over the lines 135 and 138. These signals are in turn applied over the line 136 to the switch 72 to cause it to become open circuited and also to the switch 73 to cause it to become open circuited. Simultaneously, the signal from the comparator 63 would be applied over line 137 to the switch 113 to cause it to become open.

The switches 77, 98 and 120 are designed in such a way that the coils thereof remain energized and the switches remain in the positions illustrated until all of the parallel connected switches between the source of potential and the energizing coil are open. As above pointed out, the switches 71, 72 and 73 connected in parallel between the battery 74 and the energizing coil 75 are open as a result of detection of the discrepancy in the monitor signal 1. When the switches open, the coil 75 becomes de-energized and the spring 90 translates the plunger 76 toward the right as viewed in FIGURE 1. Such translation causes the line 11 carrying the working fluid from channel 1 to become open circuited by the movable arm 78 moving from stationary contact 82 to stationary contact 83. The line 21 from channel 2 becomes closed through movement of the movable arm 79 between stationary contacts 84 and 85 and since arm 103 is in engagement with stationary contact 106 of the switch 98, working fluid now passes through the line 21 to the actuator 100. Even though the movable contact arms 80 and 81 move to their closed positions the lines 31 and 51 remain open circuited because of the open contacts of switches 98 and 120.

Although this system has undergone one failure, it should be noted that two operative channels capable of supplying working fluid to the actuator 100 remain in the system. Therefore, the system is capable of sustaining a second failure without system degradation and thus is a fail-operate, fail-operate type system.

In the event of a failure occurring in channel 2, such that the monitor signal 2 is not in agreement with the monitor signals 3 and 4, the sequence of events described below would occur, assuming the previously failed chanel 1 as above described. A discrepancy detection signal appears upon the lines 133 and 134 and causes switches 93 and 114 to become open circuited. A detection failure signal also appears at line 139, which is connected to the comparator 65, and operates to open circuit the switch 94. Under these circumstances (remembering that switch 92 was open circuited upon the failure signal appearing on line 32), the coil 97 becomes de-energized and the spring 99 causes the plunger 96 to move toward the right as viewed in FIGURE 2, thus, opening the switch 103 and closing the switches 104 and 105. As a result of the operation of switch 98 (and the previous operation of switch 77) line 31 now supplies working fluid from channel 3 through the closed switches 104 and 121 to the actuator 100, while the channels 1 and 2 working fluid lines 11 and 21, respectively, are open circuited by the open switches 78 and 103.

As a result of two failures occurring in the system, there remains only one operative channel. In the event of a subsequent failure the system can no longer position the load 101 in accordance with input signals thereto without degradation of control. Therefore, the mission to which the system had been assigned would be subject to failure in the event of any failure occurring in channel 3. Such a failure may however yet be detected through the utilization of the information provided by the monitor signals 3 and 4 and the respective comparators to which these signals are applied. In the event of such a failure, occurring in channel 3 the comparator 66 would provide a detection failure signal over the line 140 to open the switch 115 (the switches 113 and 114 being previously opened) to thereby de-energize the coil 117 by permitting the spring 119 to move the plunger 118 toward the right thereby opening switch 121 and closing switch 122. As a result of this sequence of operations, working fluid can no longer be applied by channels 1, 2 or 3 to the actuator 100. However, switches 81, 105 and 122 now being in their closed positions fluid is applied from the fail-neutral apparatus 50 over the line 51 to the actuator 100 in such a manner as to position the load 101 in a predetermined position. Typically, this position would be some neutral position to preclude violent, destructive motions being imparted as a result of the failed system to the aircraft or other apparatus which is being controlled.

From the foregoing description it should be recognized by those skilled in the art that in the event the first failure to occur was in channel 2, such that the monitor signal 2 was the signal which did not agree with signals 1, 3 and 4 then each of the switches 92, 93 and 94 would become open circuited thereby opening switch 103 and closing switches 104 and 105 to render channel 2 inoperative in the event of a subsequent failure. Under these circumstances, channel 1 would continue to provide working fluid to the actuator 100.

Similarly, in the event that channel 3 provided the signal which did not agree, switches 113, 114 and 115 would become open circuited thus causing the arm 121 to move to the open circuited position and the arm 122 to the closed circuited position, thereby rendering channel 3 inoperative. Under these circumstances channel 1 would remain in control as above described.

In the event channel 2 is the failed channel and a subsequent failure occurred in channel 1 it should now be obvious that control of this system would be transferred from channel 1 to channel 3. Likewise if channel 3 were the first to fail, control would be transferred in the event the subsequent failure was in channel 1 from channel 1 to channel 2.

Figure 2:
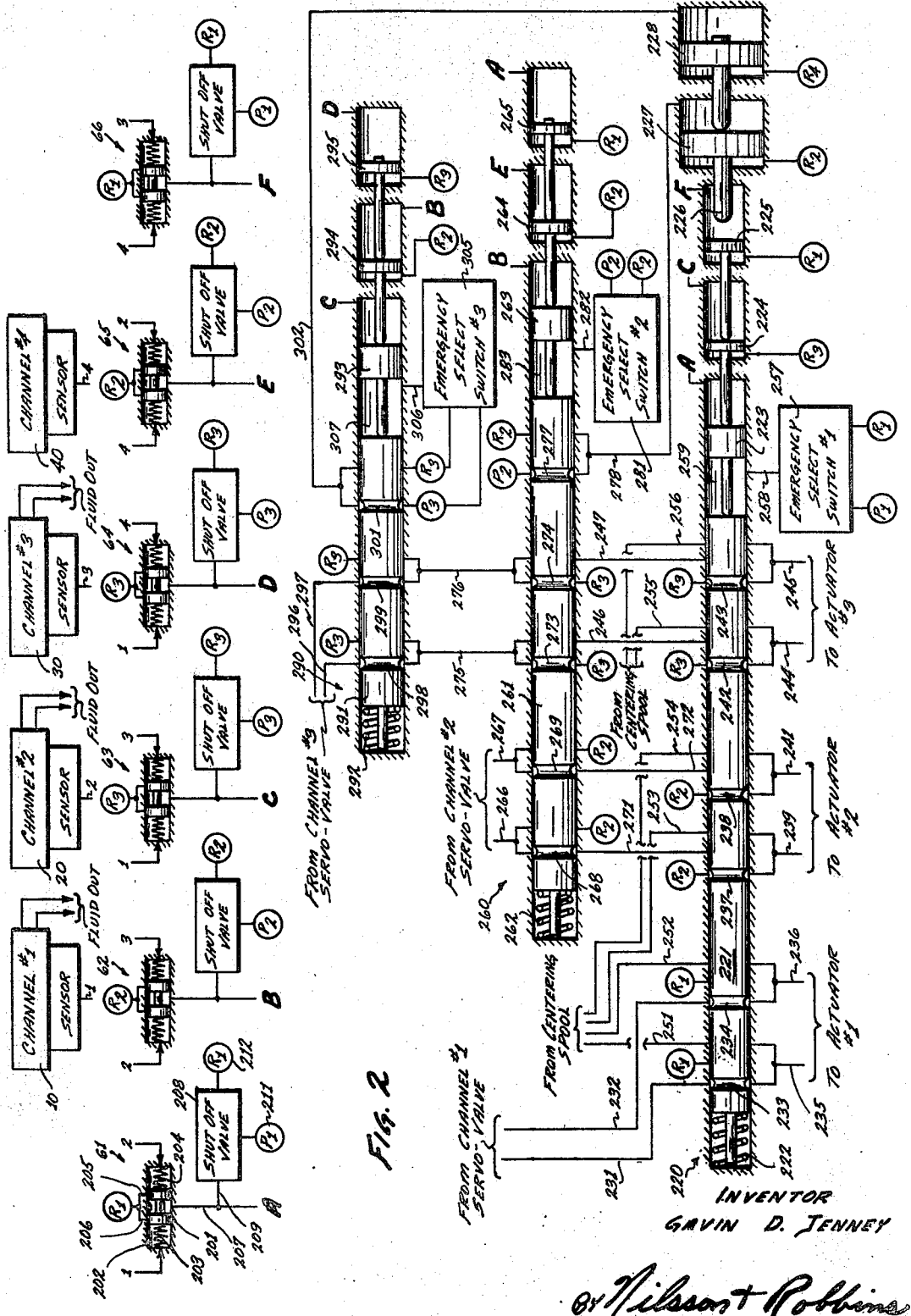
FIGURE 2 is a schematic illustration of one form of the present invention as it may be embodied in hydraerically-powered apparatus.

Referring now to FIGURE 2, there is illustrated in schematic form one embodiment of a system in accordance with the present invention where in the monitor signals as generated by the sensors are hydraeric pressure signals and the system functions utilizing hydraeric power, for example hydraulic fluid under pressure. Where appropriate, the same numerals utilized in FIGURE 1 are also utilized in FIGURE 2. In the embodiment of the invention as ilustrated in FIGURE 2, the channels 1, 2, 3 and 4 indicated by the numerals 10, 20, 30 and 40 along with the sensors attached thereto will take the form of an electro-hydraulic servo valve and a flapper which follows the control valve thereof positioned adjacent a nozzle to provide a monitor signal in the form of a hydraulic output signal. As illustrated in Patent 3,338,138 above referred to, the output of the electro-hydraulic servo valve is designated fluid out from each of the three channels. The fluid out being applied to one of the three switching means in the form of engage valves which will be described more fully below. Since the electro-hydraulic servo valve in the sensor apparatus is fully described in Patent 3,338,138, no detailed illustration or description thereto is deemed necessary for a thorough understanding of the present invention.

The output signals from each of the sensors attached to the channels are again designated by the numerals 1, 2, 3 and 4, respectively, for the channels 10, 20, 30 and 40. These signals are applied to the comparators 61 through 66 in the same manner as described in conjunction with FIGURE 1.

The comparators 61 through 66 are each constructed so as to include a spool valve 201 slidably disposed within a cylinder 202 and spring loaded by spring means 203 and 204 to a quiescent center position as illustrated. In the center position, the lands on the spool valve 201 block a pair of ports to which conduits 205 and 206 connect system return $R_1$ as shown. An output conduit 207 is also connected to the cylinder 202. Under normal operating conditions system return $R_1$ is not connected to the conduit 207. However, should there be a discrepancy between the monitor signals 1 and 2 applied to each side of the spool valve 201 (it should be noted that the end areas of the spool valve are equal), the spool valve 201 translates thus connecting system return, irrespective of the direction of the translation, to the conduit 207. Thus, system return would be applied at point A which is conected to the engage valves at the points also marked A as will be more fully described below. It should also be noted that a shut-off valve means 208 is connected by conduit 209 to conduit 207. The shut-off valve means 208 has conected to it a system pressure source $P_1$ as shown at 211 and the system return $R_1$ at 212. Again, under normal operating conditions the shut-off valve, when the system is normally operative, blocks system return $R_1$ shown at 212 and applies system pressure $P_1$ shown at 211 to the conduit 207. Details of such a shut-off valve can be obtained by reference to the patent above referred to and the function of the shut-off valve in the present structure is the same as that described in the above patent. Therefore, detailed illustration or description thereof is not deemed necessary in the present disclosure. Each of the remaining comparators 62 through 66 and the shut-off valves connected thereto are identical to the comparator 61 and the shut-off valve 208 and further description thereof will not be given herein except insofar as the function which is performed during detection of a failure in a particular channel.

As is illustrated in the remainder of FIGURE 2, three valve means in the form of slide valves are utilized to control the application of working fluid from channels 1, 2 and 3 to the actuators 1, 2 and 3 which actuators may be a single tandem ganged actuator mechanism. The first valve means 220 is a slide valve 221 having a first valve station conected to actuator 1, a second valve station connected to actuator 2 and a third valve station connected to actuator 3. The slide valve 221 is spring loaded by a spring means 222 constantly urging the slide valve 221 toward the right as viewed in FIGURE 2. Through the application of fluid pressure from the outputs A, C and F, taken at the conduits connected to comparators 61, 63 and 66, the valve 221 is urged, by the fluid presure acting against the surface of the buttons 223, 224 and 225, toward the left against the spring 222. When the slide valve 221 is in the position as illustrated in FIGURE 2, it is then in the normally operative non-failure type position. As is illustrated, the valve 221 is a three-position valve; the first of these positions is as illustrated, the second of these positions is when the valve has translated through the loss of pressures at A, C and F toward the right so that the button 225 rests against the stop 226, which is held in place by the application of system pressure $P_2$ against the button 227, and/or by the application of system pressure $P_3$ so that it operates against the area of the button 228. The third position is a further translation to the righ upon the loss of system pressures $P_2$ and $P_3$ being applied to the buttons 227, and 228, as will be more fully explained hereinbelow.

In the first position, as illustrated in FIGURE 2, fluid out is applied through conduits 231 and 232 from channel 1 through the valve openings 233 and 234 and through conduits 235 and 236 to actuator 1.

In the fiirst position, as illustrated, system return $R_2$ is connected through the valve 221 at 237 and 238 to the actuator 2 over the conduits 239 and 241. Similarly, system return $R_3$ is connected through the valve at 242 and 243 to actuator 3 through the conduits 244 and 245 respectively.

A second valve means 260 also takes the form of a slide valve 261 which is spring loaded by a spring 262 toward the right as illustrated in FIGURE 2. Again, by application of signals from the conduits B, E and A from the outputs of comparators 62, 65 and 61 respectively, fluid pressure acting against the buttons 263, 264 and 265, respectively maintain the slide valve, during normal operation, in the position illustrated in FIGURE 2. The slide valve 261 is a two-position valve. The first position being in the operative position as illustrated and the second position being translation toward the right upon the loss of the pressures at B, E and A. In the operative position as illustrated, working fluid from channel 2, at the fluid out portion thereof, is applied to conduits 266 and 267. Such fluid passes through the slide valve 261 at 268 and 269 and is applied through the conduits 271 and 272 respectively to the slide valve 221. However, since the slide valve 221 is in the operative position as illustrated, the conduits 271 and 272 are blocked thereby, and thus the working fluid from channel 2 is not applied to actuator 2.

In the normal operational position as illustrated in FIGURE 2, valve 261 at 273 ad 274 connects system return $R_3$ to the conduits 275 and 276 respectively. Also, system pressure $P_2$ is connected by valve 261 at 277 through the conduit 278 to act upon the button 227 of valve means 220.

Third valve means 290 also takes the form of a slide valve 291 which is spring loaded by a spring 292 urging the valve 291 toward the right as viewed in FIGURE 2. By application of pressures from C, D and B at the output conduits connected to comparators 63, 62 and 64, respectively, to operate against the buttons 293, 294 and 295 respectively, the valve 291 is maintained in the normal operational position as illustrated. In this position, the fluid out from channel 3 is applied through conduits 296 and 297 and the valve 290 at 298 and 299 to the conduits 275 and 276 respectively. As above pointed out, the conduits 275 and 276 are, in the normal operational position of valve means 260, connected to system return $R_3$ and therefore the working fluid is merely returned to the system return or reservoir.

System pressure $P_3$ is applied by valve means 290 at 301 over the line or conduit 302 to operate against the button 228 of the valve means 220.

In summary, in the normal operational position of the valve means 220, 260 and 290 as illustrated in FIGURE 2, working fluid from the channel 1 electrohydraulic servo valve is applied to actuator 1 while the working fluid from channels 2 and 3 are not applied to actuators 2 and 3. However, the working fluid is available at the valve means for application should such be necessary.

In operation of the valve means 220, 260 and 290 as illustrated in FIGURE 2, if channel 1 now mulfunctions so that the pressure signal from sensor 1 does not agree with the remainder of the signals, the slide valve in the comparators 61, 63 and 66 translates thus connecting the respective system return to the conduits connected thereto and thereby causing system return to appear at points A, C and F respectively. Upon such occurrence, the shut-off valves connected to the output of each of the comparators 61, 63 and 66 lock in the system return to those conduits so that system return remains at points A, C and F. Upon such an occurrence, the slide valve 221, in response to the force of spring 222, and the absence of pressure at positions A, C and F, causes the slide valve 221 to move toward the right until button 225 contacts the stop means 226. In this position, at the first valve station, system return $R_1$ is connected through the valve at 233 and 234 to actuator 1 thus by-passing the same and rendering channel 1 ineffective or disabled insofar as any control of the system is concerned. Simultaneously, the working fluid from channel 2 is connected at 237 and 238 of the slide valve 221 to actuator 2 thereby causing channel 2 to assume control of the system. At the same point in time the valve 221 at 242 and 243 in valve station 3 is positioned to receive fluid through conduits 246 and 247. However, these conduits are blocked by slide valve 261, and therefore, no effect upon actuator is effected in this position. Thus, in the event the failure occurs in channel 1, command of the system is transferred from the failed channel 1 to channel 2 and the system is ready to further transfer command to channel 3 should there be a subsequent failure in channel 2.

In the event of such a subsequent failure in channel 2 (after a previous failure in channel 1) the comparators 62 and 65 connect system return to points B and E (system return already being connected to pint A) and the slide valve 261 translates to its second position by virtue of the force of spring 262. In such second position system return $R_2$ is connected to conduits 266 and 267 thereby rendering channel 2 ineffective to control this system, that is channel 2 is disabled. Simultaneously, the output from channel 3 is applied to actuator 3 by the valve 261 at 273 and 274 connecting conduits 275 and 276 respectively to conduits 246 and 247 respectively, it being recalled that valve 221 at 242 and 243 has connected actuator 3 to the conduits 246 and 247. Thereby control is transferred from channel 2, which is now failed, to channel 3. At the same time translation of the slide valve 261 has disconnected system pressure $P_2$ by movement of the valve at 277 from acting against the button 227 and has connected system return $R_2$ thereto. Such action renders the system ready to transfer to its fail-neutral capability in the event of a discrepancy between channels 3 and 4.

In the event that such does occur, translation of the spool valve in comparator 64 connects system return to point D, it being remembered that system return has already been connected to points C and B. Upon system return being connected to point D, the spring 292 forces the slide valve 291 toward the right as viewed in FIGURE 1. Such translation connects system return $R_3$ at points 298 and 299 to actuator 3 thereby disabling channel 3 as to any control of this system. Simultaneously, system pressure from the source $P_3$ is disconnected by position 301 of slide valve 291 from application to the button 228 and system return $R_3$ is connected thereto. Under these conditions slide valve 221 is translated to its third position through the actuation of the spring 222 thus moving the entire assembly of the valve means 220, including the buttons 223 through 228, their full extent toward the right, which is at that position where button 228 bottoms out against the housing. Under these conditions each of the actuators 1, 2 and 3 is connected to a centering spool apparatus which connects system pressures $P_1$, $P_2$ and $P_3$ to actuators 1, 2 and 3, respectively, to cause it to move to a predetermined position thereby moving a controlled member connected to the actuator to some predetermined position. A further and thorough description of the centering spool and the matter of its operation is given hereinbelow.

In the event the first failure to occur is in channel 2 it will become apparent to those skilled in the art that system return is connected to points B, E and A and the slide valve 261 is translated to its second position. Under these circumstances, the output from channel 2 is connected through positions 268 and 269 on the slide valve 261 to system return $R_2$, thereby rendering channel 2 incapable of any control over this system in the event of subsequent switching of valve means 220. At the same time channel 3 is prepared for assuming control in the event of translation of slide valve 220 by connecting the output thereof to the conduits 246 and 247 as above described. Thus, if a second failure then occurred and that failure appeared in channel 1, transfer of control of the system would go from channel 1 to channel 3.

In the event the first failure to occur is in channel 3 system return would be connected to points C, B and D and the slide valve 291 would be translated toward the right. Under these circumstances, the output from channel 3 would be blocked by the slide valve 291 and system return $R_3$ would be connected to the points 298 and 299 thereby rendering channel 3 ineffective to ever assume control of the system. In the event the second failure to occur appeared in channel 2 the operation as immediately above described would than occur and in those cases control would remain in channel 1 until a disagreement between channel 1 and channel 4 occurred at which point the system would immediately transfer to its fail-neutral capability.

Figure 3:
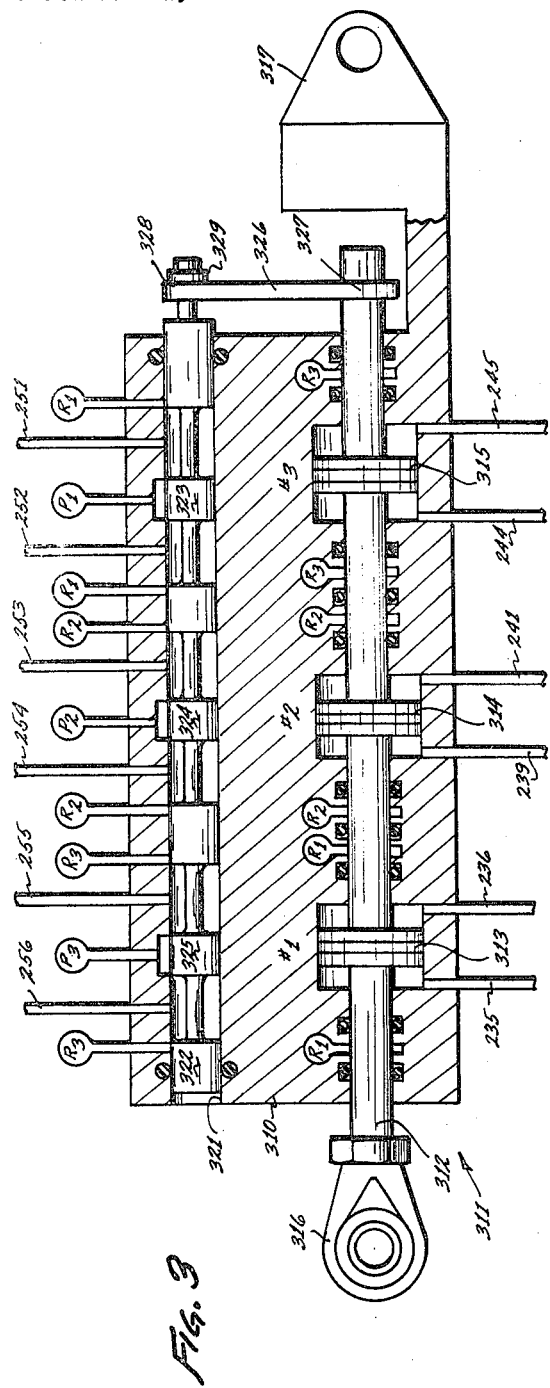
FIGURE 3 illustrates in detail the fail-neutral mechanization utilizing one form of hydraerically powered apparatus.

Referring now more specifically to FIGURE 3, the fail-neutral capability is illustrated. As is shown in FIGURE 3, an actuator includes a body 310 within which there is housed a tandem ram generally illustrated at 311 and comprising a connecting rod 312 having disposed thereon actuator pistons 313, 314 and 315 thereby forming actuators 1, 2 and 3 as designated. The rod 312 is adapted at 316 for connection to a load or to a fixed point and at the opposite end of the body is adapted as shown at 317 for connection to a load or to a fixed point as the vehicle to which the actuator is connected, as the case may be. The ram 311 operates in the well known manner by the application of working fluid from channel 1 to actuator 1, from channel 2 to actuator 2, and from channel 3 to actuator 3, depending upon the particular channel which is in command. The numerals utilized indicating conduits connected to each of the actuators are the same as those utilized with respect to the conduits leading from the slide valve 221 to each of the actuators.

In the event slide valve 221 (FIGURE 2) moves to its third position so that the conduits 251 through 256, as illustrated in FIGURE 2, are connected from the centering spool to the actuator, the actuator is caused to return to its center position (or some predetermined position). Disposed within the body 310 is a cylinder 321 within which there is positioned a spool valve 322. System pressures $P_1$, $P_2$ and $P_3$ are connected to the cylinder 321 but when the valve 322 is in its centered position as illustrated, each of the system pressures $P_1$, $P_2$ and $P_3$ are blocked by lands 323, 324 and 325 respectively. The position of the spool 322 is controlled by positioning the connecting rod 312 of the ram 311 by means of an adjustable linkage 326 which is affixed at one end 327 to the connecting rod and at the opposite end 328 to one end of the spool 322. As is noted by the nut 329, the position of the spool 322 with respect to the rod 312 is adjustable to obtain the desired positioning of the ram when the spool 322 is in its neutral or centered position as illustrated.

It should be noted that in the event the slide valve 221 (FIGURE 2) is in either of its first or second positions, any output from the centering spool 322 is blocked from entering the actuator ram 311 by this positioning of the slide valve 221. It is only when the slide valve 221 is in its third, or fail-neutral position, that the output of the centering spool 322 is permitted to enter the actuators 1, 2 and 3.

Assuming now that the slide valve 221 has translated to its fail-neutral position, the output of the centering spool 322 becomes effective. Under these conditions assuming the ram 311 is displaced toward the right so that the lands 323, 324 and 325 are displaced toward the right, system pressure is applied from source $P_1$ through the conduit 252, through the slide valve 221 at 234 to the conduit 236 so that fluid pressure from the source $P_1$ is applied to the right side of the piston 313 to cause it to move toward the lifht. Simultaneously system return $R_1$ is connected through the conduit 251 to the conduit 235 and thereby to the opposite side of the piston 313. Similarly, system pressure from source $P_2$ is applied through conduit 254 to valve 221 at point 238 thereof and to the conduit 241 and thus to the right side of the piston the actuator on the ram 311 toward the left. Simultaneously, system return $R_2$ is connected to the conduit 235 and through the valve 221 to the conduit 239 on the opposite side of the piston 314. At the same time, system pressure $P_3$ is connected through the conduit 256 and the valve 221 at point 243 thereof to the conduit 245 to the right side of the piston 315 to also assist in returning the actuator on the ram 311 toward the lifet. Simultaneously, system return is connected to the left side of the piston 315 through the conduit 244 and the valve 2211 to the conduit 255. Obviously, if the ram 311 is displaced toward the left, the connection of the fluid from the source $P_1$, $P_2$ and $P_3$ will be to the opposite sides of the pistons 313, 314 and 315 respectively to move the ram in the opposite direction to its predetermined position through the centering of the spool valve 322. Those skilled in the art will recognize that additional parting may be provided in the body 310 and lands on the spool 322 to connect a fourth fluid pressure source and its return through the centering spool to a fourth actuator to insure the fail-neutral capability in the event of loss of fluid pressure sources $P_1$, $P_2$ and $P_3$. Thus, it can be seen that in the event of a final discrepancy between the remaining channels in the system, then the apparatus to which the actuator is connected is caused to automatically return to a predetermined position established depending upon the apparatus to which the system is connected.

In certain missions of various apparatus which might embody a control system in accordance with the present invention it is also desirable to enable the operator to select a given channel from channels 1, 2 or 3 to provide hydraulic assist in the control of the apparatus even though that particular channel may have previously been disabled through the automatic operation of the system in the manner above described. Such a situation can occur and the operator may select a channel when it is his judgement that a particular channel was not in fact inoperative but rather it may have been the monitor channel which was at fault. Such provision is provided (referring to FIGURE 2) for channel 1 by the emergency select switch 1 illustrated at 257 which is connected by conduit 258 so as to apply either fluid pressure from source $P_1$ or return $R_1$ to the chamber 259 so as to operate against one end of the slide valve 221 and cause it to return to the operational position as illustrated in FIGURE 2. Similar provision is made for channel 2 by the emergency select switch 281 which by way of the conduit 282 connects system pressure $P_2$ or return $R_2$ to a chamber 283 to cause the slide valve 261 to return to its operational position is illustrated. Also similar provision is made by the emergency select switch 3 illustrated at 305 which connects system pressure $P_3$ or system return $R_3$ by way of conduit 306 to the chamber 307 to cause the slide valve 291 to be returned to its operational position as illustrated in FIGURE 2. The details of one form of emergency select switch which may be utilized is illustrated schematically in FIGURE 4 to which reference is hereby made.

Figure 4:
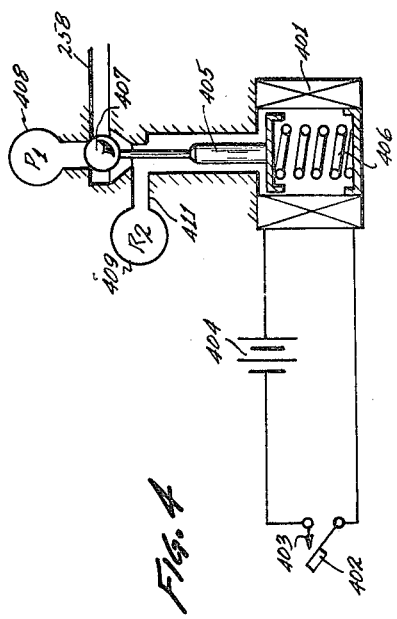
FIGURE 4 illustrates in detail a portion of the circuit illustrated in FIGURE 2.

In FIGURE 4, there is illustrated a solenoid operated switching apparatus which includes an energizing coil 401 which may be energized through the closing of a movable contact 402 into engagement with a stationary contact 403 to apply a source of potential such as battery 404 to the coil 401. Upon application of the electrical energy thereby energizing the coil 401, the plunger 405 is retracted against the force of the spring 406 which in the absence of energization for the coil 401 constantly urges the plunger upwardly as viewed in FIGURE 4. In the absence of energization of the coil the ball valve 407 is seated in such a manner as to block the application of the source of pressure $P_1$ as shown at 408. At the same time, system return $R_2$ as shown at 409 is applied through the conduit 411 to the conduit 258 and thus the chamber 259 (FIGURE 2). If, however, the operator selects channel 1 for emergency assist purposes, and he depresses the switch 402, energizing coil 401 and retracting the plunger 405 and with it the ball 407, pressure from the source 408 then passes through the conduit 258 to the chamber 259 placing the slide valve 221 in the position illustrated in FIGURE 2 thereby connecting the output from the channel 1 electro-hydraulic servo valve into communication with actuator 1. At the same time the ball 407 blocks system return $R_2$ from the conduit 258.

From the foregoing description those skilled in the art will recognize that some redundant switching is illustrated and described with respect to FIGURES 1 and 2. For example, button 265 and the connection of point A may be eliminated from valve means 260, and button 293 and point C as well as button 294 and point B may be eliminated from valve means 290 without deleteriously affecting the operation of the system.

There has thus been illustrated and described in some detail a system which may utilize the output of four (4) sensor devices to thereby provide a redundant control system which has the capability of fail-operate, fail-operate, fail-neutral and which also may have the further capability of operator selection of any desired control channel even though the same has previously been excluded automatically.

I claim:
1. A hydraeric redundant control system for positioning a movable member in response to input signals applied to said system comprising;
   actuator means adapted to be connected to position said movable member;
   1st, 2nd, 3rd and 4th channels, three of said channels being capable of delivering hydraeric fluid to said actuator means;
   1st, 2nd, 3rd and 4th sensor means connected for providing an individual monitor signal indicative of the status of each of said channels, respectively;
   comparator means connected to receive said monitor signals for comparing individual pairs of said monitor signals to detect discrepancy therebetween;
   switch means connected to said comparator means and operative upon said detection of a discrepancy between pre-selected pairs of said monitor signals to disable a pre-selected one of said channels; and
   said control system remaining operative to position said movable member without substantial system degradation until three of said four channels have been disabled.

2. A redundant control system as defined in claim 1 which further includes means for automatically positioning said actuator in a predetermined position only upon detection of a third discrepancy.

3. A redundant control system as defined in claim 2 wherein said automatic positioning means is a valve means connected between a source of hydraeric fluid and said actuator means, said valve means being coupled to said actuator means and opened by movement of said actuator means from said predetermined position and closed only by return of said actuator to said predetermined position.

4. A redundant control system as defined in claim 1 wherein said monitor signals are hydraeric signals and said comparator means includes six spool valves, each of said spool valves having a different combination of two of said monitor signals applied thereto.

5. A redundant control system as defined in claim 1 wherein said switch means includes three individual switches, each operable in response only to a discrepancy in a predetermined monitor signal.

6. A redundant control system as defined in claim 5 wherein one of said switches is a three position switch and the others of said switches are two position switches, said one of said switches connecting hydraeric fluid from:
   (a) said 1st channel to said actuator means when in its first position,
   (b) said 2nd channel to said actuator means when in its second position, and
   (c) said 3rd channel to said actuator means when in its second position and said others of said switches are in their second positions; and
said one of said switches disables said 1st, 2nd and 3rd channels from control of said actuator means in its third position.

7. A redundant control system as defined in claim 6 which further includes means for automatically positioning said actuator to a predetermined position connected to said actuator when said one of said switches is in its third position.

8. A redundant control system as defined in claim 7 wherein each of said switches is a slide valve and each of said slide valves is connected to operate responsive to a predetermined combination of detected discrepancies thereby to be moved to a different position in the event of a detection of a given discrepancy.

9. A redundant control system as defined in claim 1 which further includes select switch means connected to each of said three channels to individually energize the same.

10. A redundant control system as defined in claim 9 wherein said select switch means is a separate solenoid operated valve connected between a hydraeric source and each of said slide valves.

11. A redundant control system as defined in claim 8 which further includes select switch means connected to each of said three channels to individually energize the same.

12. A redundant control system as defined in claim 4 wherein said switch means includes a plurality of slide valves and each of said slide valves is connected to operate responsive to translation of a predetermined combination of said spool valves thereby to be moved to a different position in the event of a detection of a given discrepancy.

References Cited
UNITED STATES PATENTS
| | | | |
|---|---|---|---|
| 3,338,138 | 8/1967 | Wood | 91—411 |
| 3,338,139 | 8/1967 | Wood | 91—411 |

PAUL E. MASLOUSKY, Primary Examiner

U.S. Cl. X.R.

91—360, 448, 461; 244—77